US012631451B2

(12) United States Patent
Ducloux et al.

(10) Patent No.: US 12,631,451 B2
(45) Date of Patent: May 19, 2026

(54) METHOD FOR REDUCING THE KERR EFFECT IN AN INTERFEROMETRY MEASURING DEVICE, AND INTERFEROMETRY MEASURING DEVICE CONFIGURED TO IMPLEMENT THIS METHOD

(71) Applicants: EXAIL, Saint-Germain-en-Laye (FR); CENTRE NATIONAL D'ETUDES SPATIALES, Paris (FR)

(72) Inventors: Eric Ducloux, Saint-Germain-en-Laye (FR); Louis Lhomme, Saint-Germain-en-Laye (FR); Nicolas Grossard, Saint-Germain-en-Laye (FR); Jérôme Hauden, Saint-Germain-en-Laye (FR)

(73) Assignees: EXAIL, Saint-Germain-en-Laye (FR); CENTRE NATIONAL D'ETUDES SPATIALES, Paris (FR)

( * ) Notice: Subject to any disclaimer, the term of this patent is extended or adjusted under 35 U.S.C. 154(b) by 279 days.

(21) Appl. No.: 18/548,849

(22) PCT Filed: Mar. 3, 2022

(86) PCT No.: PCT/EP2022/055467
§ 371 (c)(1),
(2) Date: Sep. 1, 2023

(87) PCT Pub. No.: WO2022/184860
PCT Pub. Date: Sep. 9, 2022

(65) Prior Publication Data
US 2024/0167818 A1 May 23, 2024

(30) Foreign Application Priority Data
Mar. 4, 2021 (FR) ...................................... 2102120

(51) Int. Cl.
*G01C 19/72* (2006.01)

(52) U.S. Cl.
CPC ........... *G01C 19/726* (2013.01); *G01C 19/72* (2013.01); *G01C 19/721* (2013.01)

(58) Field of Classification Search
CPC ..... G01C 19/72; G01C 19/721; G01C 19/726
See application file for complete search history.

(56) References Cited

U.S. PATENT DOCUMENTS 4,773,759 A    9/1988  Bergh et al.
5,563,705 A *  10/1996  Sanders ............... G01C 19/721
                                                    356/464

(Continued)

FOREIGN PATENT DOCUMENTS

WO    WO-2014163721 A2 * 10/2014 ............. G01C 19/66
WO    WO-2018071729 A1 *  4/2018 ............. G01C 19/72

OTHER PUBLICATIONS

Bergh R A et al., "Compensation of the Optical Kerr Effect in Fiber-Optic Gyroscopes," Jan. 1, 1989, [SPIE Milestone Series], Bellingham, SPIE, US, pp. 316-318, XP000232998.

(Continued)

*Primary Examiner* — Michael A Lyons
(74) *Attorney, Agent, or Firm* — NIXON & VANDERHYE

(57) ABSTRACT

Disclosed is a method for reducing the Kerr effect in an interferometry measuring device including a generator configured to emit an input periodic light signal, and a Sagnac interferometer in which two counterpropagating signals travel and combine so as to form a periodic output signal having at least two power values, the method including: determining a phase shift between the two counterpropagating signals a first time, and cancelling out the phase shift; and then determining a phase shift between the two counterpropagating signals a second time; and adjusting the ratio (Continued)

between the average powers of the counterpropagating signals so as to cancel out the value of the phase shift determined in the second determination. Also disclosed is an interferometry measuring device configured to implement such method.

14 Claims, 11 Drawing Sheets

(56) References Cited

U.S. PATENT DOCUMENTS

| | | | | |
|---|---|---|---|---|
| 6,046,810 A | * | 4/2000 | Sanders | G01C 19/72 |
| | | | | 356/459 |
| 11,885,622 B2 | * | 1/2024 | Ducloux | G01C 19/727 |

OTHER PUBLICATIONS

Liu R Y et al., "Progress Toward an Inertial Grade Fiber Optics Gyroscope," Selected Papers on Fiber Optic Gyroscopes; [SPIE Milestone Series], Bellingham, SPIE, US, pp. 585-589, Jan. 1, 1989, XP000233015.
International Search Report for PCT/EP2022/055467 mailed Jun. 27, 2022, 6 pages.
Written Opinion of the ISA for PCT/EP2022/055467 mailed Jun. 27, 2022, 6 pages.

* cited by examiner

METHOD FOR REDUCING THE KERR EFFECT IN AN INTERFEROMETRY MEASURING DEVICE, AND INTERFEROMETRY MEASURING DEVICE CONFIGURED TO IMPLEMENT THIS METHOD

CROSS-REFERENCE TO RELATED APPLICATIONS

This application is the U.S. national phase of International Application No. PCT/EP2022/055467 filed Mar. 3, 2022 which designated the U.S. and claims priority to FR 2102120 filed Mar. 4, 2021, the entire contents of each of which are hereby incorporated by reference.

TECHNICAL FIELD

The present invention generally relates to the field of interferometric systems.

In particular, the invention relates to interferometric systems including a Sagnac interferometer with a fibre-optic loop and finds a particularly advantageous application in fibre-optic gyroscopes (commonly referred to by the acronym "FOG" by the person skilled in the art).

The invention especially relates to a method for reducing the Kerr effect in an interferometric measuring device, and to an interferometric measuring device configured to implement this method.

TECHNOLOGICAL BACKGROUND

A Sagnac interferometer conventionally includes a light source generating an input optical signal coupled to an optical loop through an optical splitter. The optical splitter is configured to split the input optical signal into two signals circulating in two contrary directions in the optical loop, conventionally called "counter-propagating signals".

At the output of the optical loop, the two counter-propagating signals combine each other in the optical splitter by producing interferences due to an optical phase shift between the two counter-propagating signals that has appeared during their circulation in the optical loop. The phase-shift measurement between the two counter-propagating signals makes it possible to quantify the phenomenon that has generated it. For example, in a gyroscope comprising a Sagnac interferometer, the phase shift is proportional to a rotation of the gyroscope in the plane of the optical loop.

A conventional embodiment of the optical loop comprises the use of a fibre-optic coil. However, parasitic phenomena may distort the measurement by introducing between the two counter-propagating signals a phase shift that does not depend on the phenomenon to be quantified and that cannot be distinguished from the phenomenon to be quantified. Therefore, at the output of a Sagnac interferometer, a total phase shift is measured which is equal to the sum of the phase shift induced by the gyroscope rotation and a parasitic phase shift.

In certain applications, in particular the very high accuracy applications, for example the rotation measurements using a gyroscope, certain parasitic effects distort the measurement in a non negligible way. That it the case of the Kerr effect.

The Kerr effect refers to an electro-optical phenomenon of birefringence, that is to say a variation of the refractive index of a material under the effect of an electric field. In a fibre-optic gyroscope, the electric fields of the counterpropagating signals substantially change the optical refractive index of the coil fibre; each of the counter-propagating beams undergoes an auto-induced Kerr effect and a Kerr effect induced by the other counter-propagating signal.

The Kerr effect is a particularly annoying problem in the fibre-optic gyroscopes using spectrally fine optical sources.

It has been observed that, in a fibre-optic gyroscope, the phase shift $\Delta\varphi k$ generated by the Kerr effect is expressed by the following formula:

$$\Delta_{\varphi k}=\varepsilon(\gamma-1)(P_M-\alpha\langle P\rangle)k^*L \qquad \text{[math. 1]}$$

with $\gamma$ the Sagnac channel balancing, that is to say the ratio between the average optical powers of each of the two interferometer channels, $P_M$ the output power at the measurement point, k the optical wave number and L the optical fibre length.

The factor $\varepsilon$ is a characteristic value of the optical fibre, representative of the refractive index variation induced by the counter-propagating signals. In a silica optical fibre, this factor depends on the dielectric susceptibility of silica $$\chi_e^{(3)}$$

and is equal to about $2\times10^{-15}$ $\mu w^{-1}$. This characteristic value is detailed in particular in "*The fiber-optic gyroscope*", H. C. Lefèvre, Artech House, Second Edition, 2014, *Chapter* 7.3.

The factor $\alpha$ is a constant close to 2 or equal to 2, for example between 1.6 and 2.4, the value of which is specific to a gyroscope structure.

It is therefore evident that a solution to cancel the phase shift $\Delta\varphi k$ induced by the Kerr effect consists in ensuring that the balancing $\gamma$ of the Sagnac interferometer channels is equal to 1 or, in other words, that the average powers of the counter-propagating signals are equal to each other.

The power balancing $\gamma$ is not only due to the geometry of the optical splitter, but also to the couplings of the two ends of the optical fibre loop to the splitter. It is indeed difficult to couple the two ends identically.

And, although each counter-propagating signal circulates in the fibre with its own power, the two counter-propagating signals have, when recombined with each other, the same optical power because the optical paths they take are reciprocal.

It is therefore difficult to characterise the power balancing $\gamma$.

SUMMARY OF THE INVENTION

The present invention provides a solution to the above-mentioned problems.

According to one aspect, it is proposed a method for reducing the Kerr effect in an interferometric measuring device including a light signal generator configured to emit a periodic input light signal having at least two non-zero input power values, and a Sagnac interferometer comprising an optical loop, a splitter configured to couple the periodic input light signal to the optical loop in order to split the light signal into mutually counter-propagating first signal and second signal, which each have at least two power values each corresponding to an input power value and which propagate in opposite directions in the optical loop and to combine said counter-propagating signals after their propagation in the loop in order to form a periodic output signal having at least two output power values each corresponding to an input power value, the method comprising a periodic modulation with at least two opposite states of the phase shift between the two counter-propagating signals (also called "phase modulation") and, over a same modulation period, a. a first series of measurements that includes at least two output power measurements at points of the output signal that have first output power values (PS) corresponding to a first input power value and that correspond to opposite phase modulation states;

b. a first phase-shift determination between the two counter-propagating signals each having a power value corresponding to the first input power value, and a cancellation of this phase shift that includes adjusting the modulation depending on the cancellation of a first calculated demodulation term that is function of said at least two measurements of the first series of measurements and that is representative of said phase shift, then c. a second series of measurements that includes at least two measurements at points of the output signal that have second output power values corresponding to a second input power value and that correspond to opposite modulation states;

d. a second phase-shift determination between the two counter-propagating signals each having a power value corresponding to the second input power value, and a cancellation of this phase shift, depending on the cancellation of a second calculated demodulation term that is function of said at least two measurements of the second series of measurements and that is representative of the phase shift.

The Kerr effect depends on the light power of the counter-propagating signals in the coil and hence on the light power of the input light signal from which they directly come from. Therefore, the Kerr effect produced by the counter-propagating signals having power values corresponding to the first input power value is distinct from the Kerr effect produced by the counter-propagating signals having a different power value, in particular here a power value corresponding to the second input power value.

Therefore, the cancellation of the phase shift determined during the first determination, i.e. a phase shift induced by the Kerr effect associated with the first input power value and induced by the rotation of the gyroscope, is inoperative on the phase shift determined during the second determination, i.e. the phase shift induced by the Kerr effect associated with the second input power value, if the Kerr effect in the coil is non-zero. Therefore, the phase shift determined during the second determination is advantageously a value representative of the Kerr effect and of the channel balancing. By adjusting the interferometer channel balancing in such a way as to cancel this phase shift value, a channel balancing equal to 1 or very close to 1 and a cancellation of the Kerr effect consequences are obtained.

It is to be observed that the term "average power", when referring to a periodic signal, is here understood as the average power of the periodic signal over an integer number of periods.

According to an implementation mode, the cancellation of the phase shift includes adjusting the ratio between the average powers of the counter-propagating signals, depending on the cancellation of the second demodulation term.

According to an implementation mode, the phase modulation is a modulation with four states opposed two by two.

The phase modulation of the two counter-propagating signals by two phase-shift values, also called two-state phase modulation, enables determining the gyroscope rotation. Advantageously, the phase modulation by four phase-shift values, or four-state phase modulation, further enables determining a phase-shift scaling factor, and hence determining the $V\pi$, i.e. the voltage required to obtain a phase shift of n between the two counter-propagating signals.

According to an implementation mode, the first series of measurements and the second series of measurements are made at points of the output signals that correspond to the same phase modulation states.

According to a mode of implementation of the method a. the first series of measurements includes a first measurement, a second measurement, a third measurement and a fourth measurement at points of the output signal that correspond to a first modulation state, a second modulation state, a third modulation state and a fourth modulation state, respectively, the first and third modulation states being opposite and the second and fourth modulation states being opposite, the first demodulation term being equal to the difference between the sum of the first and fourth measurements and the sum of the second and third measurements;

b. the second series of measurements includes a fifth measurement, a sixth measurement, a seventh measurement and an eighth measurement at points of the output signal that correspond to the first modulation state, the second modulation state, the third modulation state and the fourth modulation state, respectively, the second demodulation term being equal to the difference between the sum of the fifth and eighth measurements and the sum of the sixth and seventh measurements.

According to an implementation mode, the first series of measurements and the second series of measurements are made at points of the output signal that correspond to distinct modulation states.

This advantageously enable adjusting, by suitable choices of modulation states, the value differences between the first series of measurements and the second series of measurements.

According to an implementation mode, the at-least-two-state phase modulation is applied according to a period equal to twice the travel time of the counter-propagating signals in the optical loop divided by a value chosen among the odd positive integer numbers.

In other words, the phase modulation of the two counter-propagating signals is made at the proper frequency of the optical fibre coil, or at an odd integer multiple of the proper frequency. A modulation at the proper frequency of the coil makes it possible to limit notch distortion and the risk of electromagnetic coupling in the electronic boards of the interferometric measuring device.

According to an implementation mode, the first input power value and the second input power value are chosen in such a way that the first output power values are higher than the second output power values. For example, the first input power value is higher than the second input power value, for example 10 times higher.

The measurement accuracy is thus improved. Indeed, the rotation measurement is highly sensitive to noise, while Kerr effect measurement is only slightly because it can be taken over a long period of time. It is therefore advantageous to make the first phase-shift determination, representative in particular of the rotation, on the power level having the better signal-to-noise ratio, and the second phase-shift determination, representative of only the Kerr effect, on the power level having the lowest signal-to-noise ratio.

According to an implementation mode, the ratio adjustment between the average powers of the two counterpropagating signals includes an electro-optical control by voltage polarisation of the splitter.

According to an implementation mode, the method includes a step of modulating the power of the periodic input light signal by way of a square-wave or rectangular-wave input optical power modulation control signal the duty cycle of which is lower than or equal to 50%, in such a way that the modulated periodic input light signal has:

at a first point of the periodic input signal, a first input power value equal to the product of the average power of the periodic input signal by a gain between 1.6 and 2.4, at a second point of the periodic input signal, a second, non-zero input power value, that is different from the first input power value.

In other words, such a power modulation of the signal enables cancelling the term $(P_M - \alpha <P>)$ of the above-mentioned phase-shift equation $\Delta ok$; it can thus be transmitted in any Sagnac interferometer, in particular in the fibre-optic gyroscope according to the invention, without generating Kerr effect or only negligible one. Such a power modulation of the input signal thus contributes to an undistorted or only slightly Kerr-effect distorted interferometric measurement.

This input light signal power modulation method is described in more detail in the patent application filed on the same day as the present application under the title "*Generator for generating an anti-Kerr-effect modulated light signal, interferometry measuring device comprising such a generator, and method for modulating a light signal*".

According to an implementation mode, the input optical power modulation control signal has a duty cycle strictly lower than 50%.

According to an implementation mode, the first input power value is higher than the second input power value.

According to another aspect, it is proposed a interferometric measurement device configured to implement the method according to the invention.

According to an embodiment, the device is a fibre-optic gyroscope.

The different features, alternatives and embodiments of the invention can be associated with each other according to various combinations, insofar as they are not incompatible or exclusive with respect to each other.

BRIEF DESCRIPTION OF THE DRAWINGS

Various other features of the invention emerge from the appended description made with reference to the drawings that illustrate non-limiting embodiments of the invention, and wherein.

It is to be noted that, in these figures, the structural and/or functional elements common to the different alternatives can have the same references numbers.

Various other modifications may be made to the invention within the scope of the appended claims.

DETAILED DESCRIPTION

Figure 1:
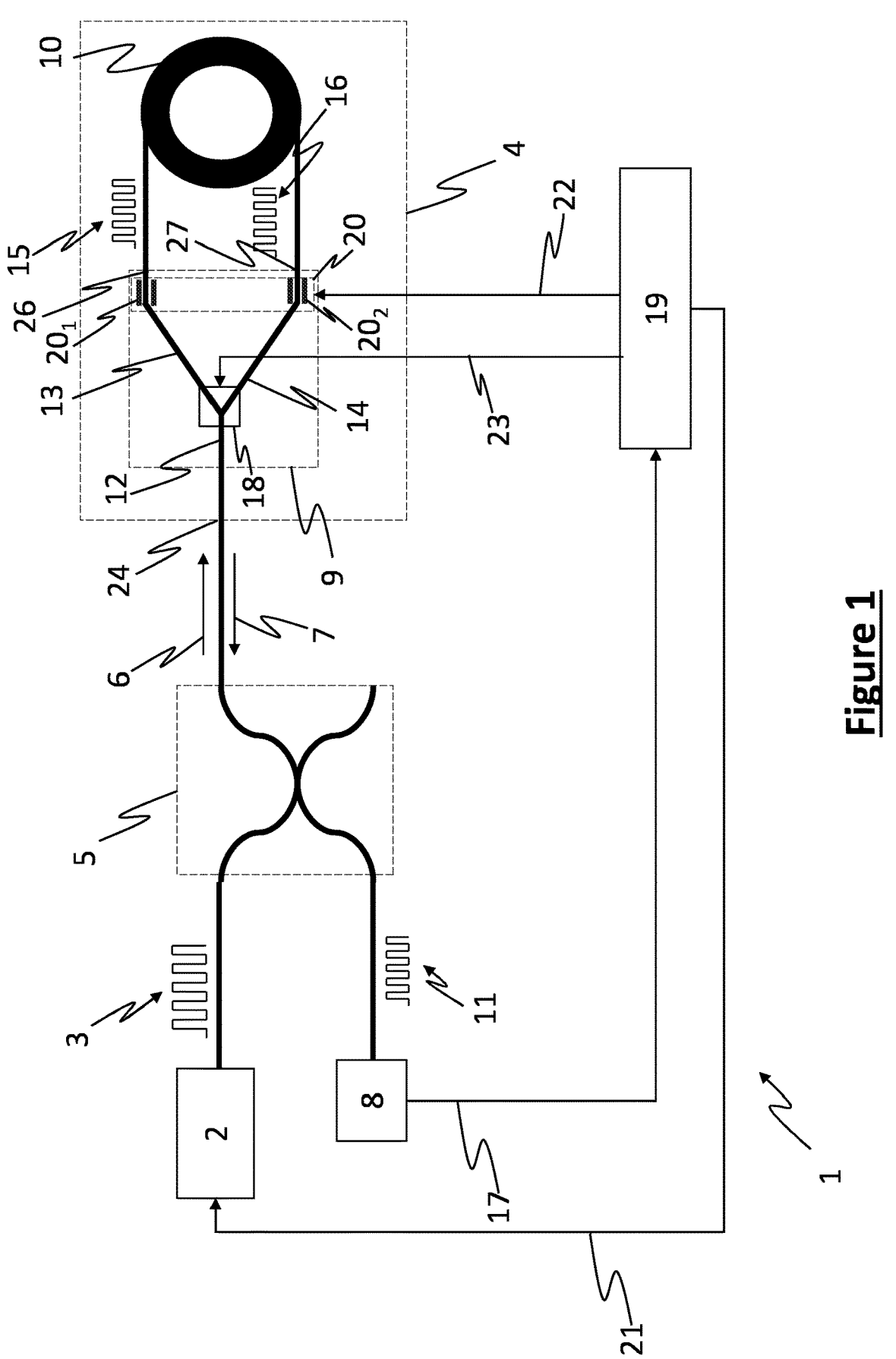
FIG. 1 illustrates a fibre-optic gyroscope according to the invention.

The fibre-optic gyroscope 1 shown in FIG. 1 includes a light signal generator 2, a Sagnac interferometer 4, an optical transmission module 5 and centralized control means 19.

The centralized control means 19 include for example an electronic board including a micro-processor, one or several analog/digital converters and a memory, and are configured to control the different elements of the gyroscope in a synchronized manner.

The optical transmission module 5 is configured to optically couple, in a forward direction 6, the light signal generator 2 to the Sagnac interferometer 4 and, in the return direction 7, the Sagnac interferometer 4 to a measurement module 8. Here, the optical transmission module is an optical coupler; it is therefore able to generate an attenuation of transmitted optical power, for example a division by two of the optical power transmitted. This potential attenuation does not affect the operation of the invention, which is compatible with any type of optical transmission module generating or not an attenuation of the optical power transmitted. In certain embodiments, the optical transmission module is an optical circulator.

In the embodiment illustrated, the light signal generator 2 is configured to generate an input light signal 3 and includes an integrated laser diode made from semi-conductor materials, for example here an integrated laser diode of the DFB ("Distributed Feed-Back") type. However, the invention is compatible with any light signal generator.

The light signal generator 2 is here controlled by the centralized control means 19 in such a way that the input light signal 3 is periodic and has at least one first input power value and one second input power value, which are non-zero.

Here, the centralized control means 19 control the generator 2 through a first control signal 21, and are here configured to modulate the supply power of the light signal generator 2, for example here by performing a two-state power modulation in such a way that the light signal 3 is a square-wave, or rectangular-wave, signal having the first non-zero input power value and the second non-zero input power value. In this example, the first input power value is higher than the second input power value. As an alternative, the light signal generator 2 can include an electro-optical power modulator located downstream from the laser diode relative to the direction of propagation of the input light signal 3, the centralized control means 19 being then configured to control the electro-optical modulator. For example, such an electro-optical modulator can be of the Mach Zehnder type.

The Sagnac interferometer 4 includes an input/output port 24, an optical separator 9 and an optical loop 10.

The input/output port 24 is configured to receive, in the forward direction 6, the input light signal 3 (potentially attenuated by the optical transmission module 5, as mentioned hereinabove), and to produce, in the return direction 7, an output light signal 11.

The fibre-optic loop 10 is here formed by an optical fibre coil of 400 metres long and 70 millimetres average diameter.

The optical splitter 9 includes a main arm 12 coupled, on the one hand, to the input/output port 24, and divided, on the other hand, into a first arm 13 coupled to a first end 26 of the optical fibre and a second arm 14 coupled to a second end 27 of the optical fibre. Therefore, the Sagnac interferometer is configured to receive the light signal 3 and to split it into a first counter-propagating signal 15 circulating from the first arm 13 into the fibre-optic loop 10 and a second counter-propagating signal 16 circulating from the second arm 14 into the fibre-optic loop 10. Each direction of propagation forms a channel of the Sagnac interferometer.

It is to be noted here that, in the field of interferometric measurements, it is conventional to define a reference direction of propagation in the optical loop. In such a case, a signal is said co-propagative, when propagating in the reference direction, and counter-propagating when propagating in the opposite direction. For the sake of simplification, no reference direction has been defined here and the two signals are considered to be mutually counter-propagating.

The optical splitter 9 is here made within an integrated electro-optical circuit made on a lithium niobate substrate. The electro-optical circuit further includes a control circuit 18 for adjusting the channel balancing of the interferometer 4, i.e. the ratio of the optical powers transmitted towards the first arm 13 and towards the second arm 14. For example here, the control circuit 18 includes an electrode controlled by the centralized control means 19. Such a circuit is described in particular in the article "*Modulateur d'intensité LiNbO*3 *à fort taux d'extinction*, N Grossard, B Pedrono, J Hauden, H Porte—*JNOG, ME*7, 2007".

Here, a phase modulator 20 is configured to modulate the phase shift between the two counter-propagating signals 15 and 16. For example here, the phase modulator includes two pairs of electrodes 201, 202, each placed on a distinct arm 13 and 14 of the optical splitter 9. In this embodiment, the phase modulator 20 is controlled by a second control signal 22 produced by the centralized control means 19.

Although the splitter 9 is theoretically provided to couple 50% of the optical power towards the first arm 15 and 50% of the optical power towards the second arm 16, the effective coupling is here different from 50%, in particular due to the couplings of the ends 26 and 27 of the optical fibre to the arms 13 and 14 of the splitter and due to the imperfections of the splitter 9.

Therefore, the counter-propagating signals 15, 16 that circulate in the coil have slightly different powers. However, because the two paths travelled by the signals 15 and 16 are reciprocal, the losses are equivalent for each complete path.

The counter-propagating signals 15 and 16 here have power values corresponding to the input power values. For example here, they each comprise a first power value corresponding to the first input power value and a second power value corresponding to the second input power value. The first power value of each counter-propagating signal 15, 16 is thus higher than its second power value. Moreover, due to the imperfection of the above-mentioned coupling, the first power values of the counter-propagating signals are different, and the second power values of the counter-propagating signals 15, 16 are different.

The Sagnac interferometer 4 is configured in such a way that a rotation of the gyroscope 1 in a plane orthogonal to the coil axis, here the plane of FIG. 1, generates a phase shift between the counter-propagating signals 15 and 16 that propagate in the loop 10.

The two counter-propagating signals 15 and 16 are recombined with each other in order to form the output light signal 11 that is transmitted in the return direction 7 from the input/output port 24 to the measurement module 8 via the optical transmission module 5. At the time of their combination, after having travelled along reciprocal optical paths, each of the counter-propagating signals 15, 16 has an equivalent power reduction.

The measurement module 8 is configured to measure the instantaneous power of the output light signal 11, or output power Ps, that is function of the phase shift between the two counter-propagating signals 15, 16. For example, the measurement module 8 includes an integrated photodiode configured to send to the centralized control means 19 an electrical measurement signal 17 representative of the output power Ps.

The output light signal 11 has first output power values corresponding to the first input power value and second output power values corresponding to the second input power value. The differences between the different first values and the differences between the different second values depend in particular of the phase shift values between the two counter-propagating signals 15, 16. Here, the first input power value is higher than the second input power value and the first output power values are higher than the second output power values.

Figure 2:
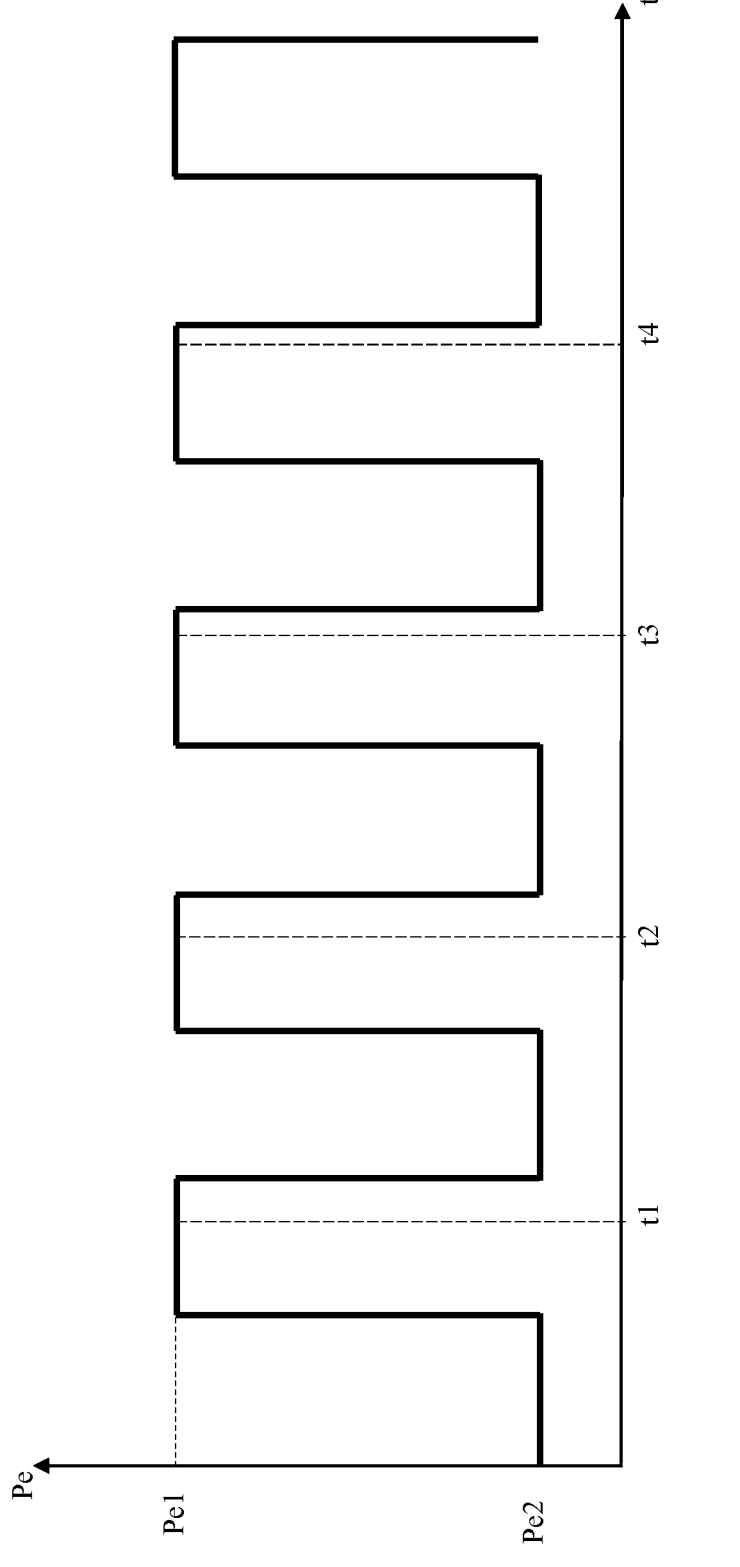
FIG. 2 is a chronogram illustrating the power evolution of the input light signal of the gyroscope of FIG. 1.

FIG. 2 is a chronogram illustrating the evolution of the input instantaneous power Pe of the input light signal 3. Here, the input light signal 3 has a rectangular-wave shape and has the first, non-zero, input instantaneous power value Pe1, and the second, non-zero, input instantaneous power value Pe2, here lower than the first input instantaneous power value Pe1. For example, the first value Pe1 is equal to 8 mW and the second power value Pe2 is equal to 1 mW.

It is to be noted here that, according to the architecture of the light signal generator 2, the materials used and the conditions in which the source is implemented, the input light signal 3 can be substantially distorted with respect to its modulation command. In order to simplify the disclosure, the characteristics of the input light signal 3 described herein, in particular its square-wave shape and its duty cycle, correspond to the ideal case in which the input light signal undergoes no distortion, and correspond to the characteristics of the modulation command.

The method according to the invention includes a periodic modulation of the phase shift between the two counter-propagating signals 15, 16 and, over a same phase shift modulation, a first series of measurements at points of the output signal having the first output power values (that correspond to the first input power value), and a second series of measurements at points of the output signal having the second output power values (that correspond to the second input power value). Here, the first input power value is a high level and the second input power value is a low level.

Figure 3:
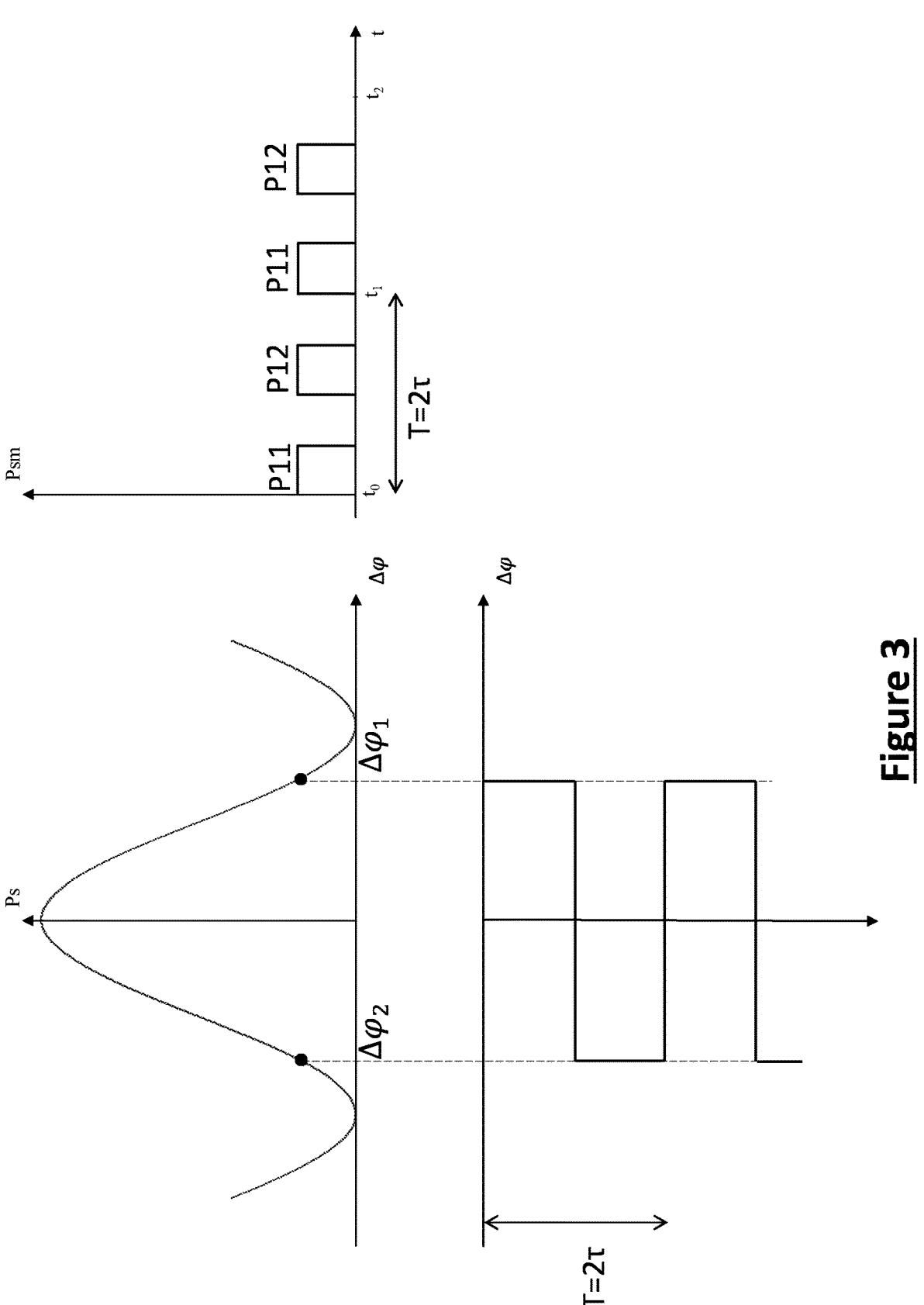
FIG. 3 illustrates a step of an mode of implementation of the method according to the invention.
Figure 4:
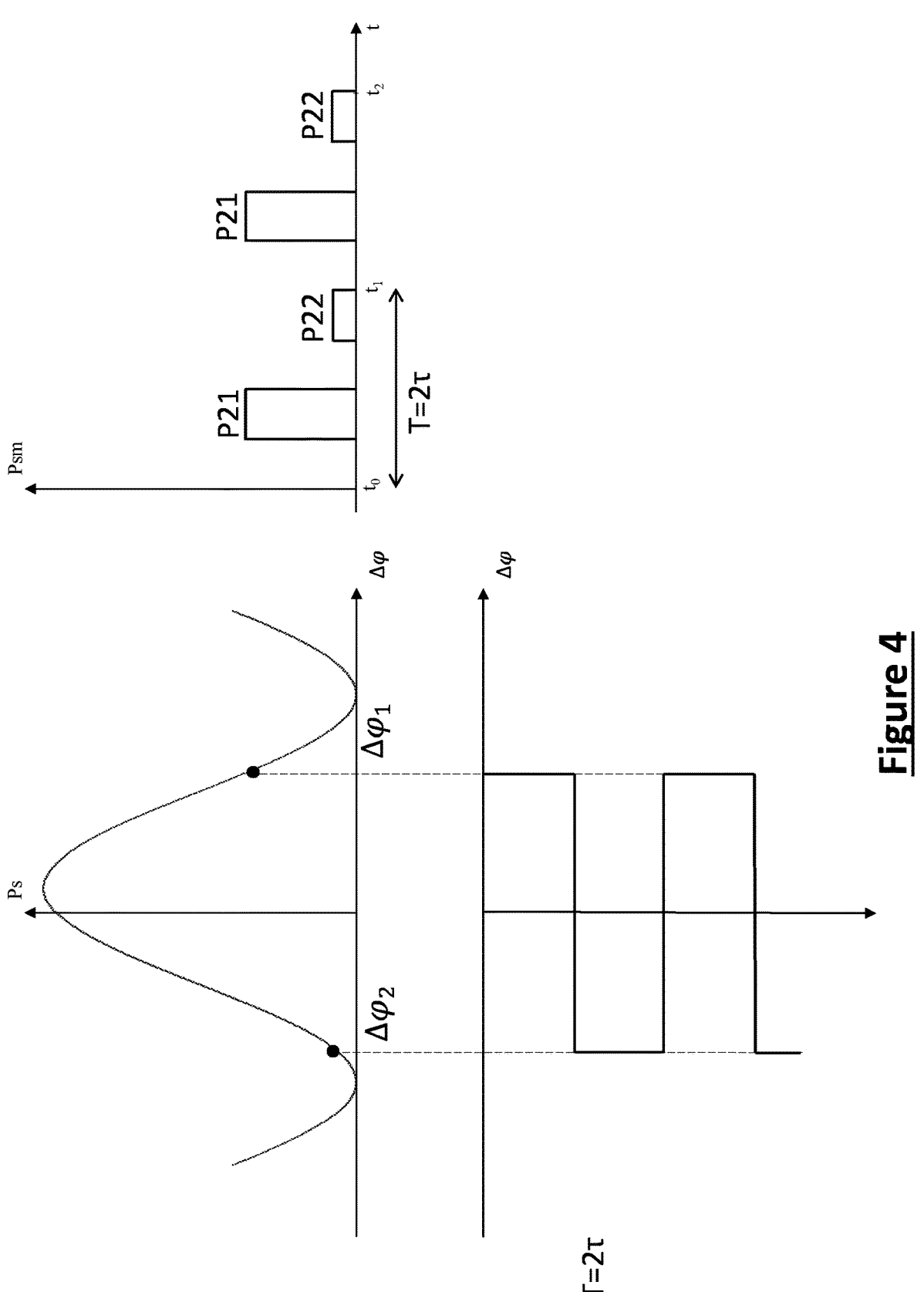
FIG. 4 illustrates another step of the mode of implementation of FIG. 3.
Figure 5:
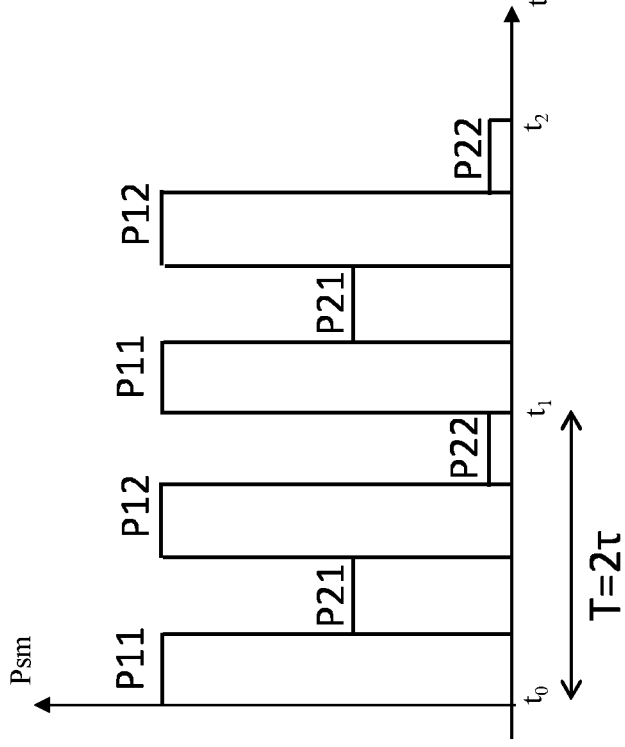
FIG. 5 illustrates a synthesis of the steps of FIGS. 3 and 4.

FIGS. 3 to 5 illustrate a mode of implementation of the method according to the invention wherein the modulation of the phase shift between the counter-propagating signals 15, 16 is a two-state modulation and wherein each series of measurements includes two measurements. Here, each measurement of a series is made at one point of the output signal corresponding to a distinct state of the modulation, it is therefore talked about a modulation with two states per input power value. Here, each modulation state is used for making a measurement of each series of measurements.

For the sake of clarity of the disclosure, FIGS. 3 and 4 each show independently the processing applied to output power values corresponding to a distinct input power value. In other words, FIGS. 3 and 4 show independently the processing applied to the first output power values and to the second output power values.

In FIG. 3, are shown, respectively: in the bottom left corner, the modulation of the phase shift Δφ between the counter-propagating signals 15, 16 by the phase modulator 20 as a function of time t; in the top left corner, the interferogram of the output signal, i.e. the output power Ps as a function of the phase shift Δφ modulation applied by the phase modulator; in the top right corner, the measured output power values Psm as a function of time t, here measured by the measurement module 8 during the first series of measurements.

The modulation is here a periodic phase modulation with two opposite states, applied over a modulation period T equal to twice the time of propagation τ of the counter-propagating signals 15 and 16 in the coil 10, i.e. applied at the proper frequency of the coil. The two states are the following: a first modulation state Δφ1=π−k; a second modulation state Δφ2=−π+k. In the example illustrated in FIGS. 3 and 4, k=π/8, and the two modulation states are the following: Δφ1=7π/8; Δφ2=−7π/8.

FIGS. 3 and 4 illustrate the implementation of the method over a first modulation period extending between a first time t0 and a second time t1, and over a second modulation period extending between the second time t1 and a third time t2.

The phase modulator 20 adjusts the modulation by adding to the two modulation states Δφ1, Δφ2 a digital phase ramp feedback (not shown in FIG. 3). The steps of this digital ramp, of duration t, cancel the phase shift between the counter-propagating signals 15 and 16 generated here by the rotation of the gyroscope 1 and by the Kerr effect.

Therefore, the interferogram is centred to the value 0 as shown in FIG. 3. It is therefore talked about a closed loop in the rotation measurement.

The first series of measurements is represented in the top right corner of FIG. 3 and includes two measurements P11 and P12 of the output power Ps sampled over each modulation period. The two measurements P11 and P12 are made at points of the output signal 11 that have the first output power values (linked to the first input power value) and to the first modulation state Δφ1 and the second modulation state Δφ2, respectively. The values of the two power measurements P11, P12 are represented by points on the curve representing the output power Ps as a function of the phase shift Δφ modulation.

The phase difference between the two counter-propagating signals 15, 16 is linked to a first demodulation term D1 determined by the centralized control means 19 based on the electrical measurement signal 17, here according to the following expression:

$$D1=P11-P12 \qquad \text{[Math 1]}$$

Therefore, controlling the digital phase ramp feedback value depending on the cancellation of the first demodulation term D1 makes it possible to know the phase shift generated by the rotation thanks to the reading of the phase ramp value required for this cancellation. For example, for that purpose, the centralized control means 19 include a first feedback loop configured to control the phase ramp depending on the cancellation of the first demodulation term D1 and to equalize that way the two measured values P11 and P12.

FIG. 4, similar to FIG. 3, illustrates the making of the second series of measurements, here two power measurements P21 and P22, sampled over each modulation period, in particular here over the first and second modulation periods. The two measurements P21 and P22 correspond to the second output power values (linked to the second input power value) and to the first modulation state Δφ1 and the second modulation state Δφ2, respectively. For this second series of measurements, the modulation of the phase shift Δφ between the two counter-propagating signals is identical to what has been described hereinabove in connection with FIG. 3.

It is to be noted here that, in FIGS. 3 and 4, the reference systems in the top right corner do not have the same scale. Indeed, the first series of measurements being made on a top state, the origin value of the reference system in FIG. 3 is far higher than the origin value of the reference system of FIG. 4.

Despite the application of the phase ramp, the curve in the top left corner of FIG. 4 is not centred to the origin of the reference system and the measured output power values P11 and P22 are different from each other. This difference in the measurements P21 and P22 indicates that a phase shift remains between the two counter-propagating signals 15 and 16.

This phase shift is not due to the rotation the effect of which on the interferogram is compensated for by the phase ramp, but to the difference between the phase shift linked to the Kerr effect produced by the counter-propagating signals having power values that correspond to the first input power value (compensated for hereinabove) and the phase shift linked to the Kerr effect produced by the counter-propagating signals having power values that correspond to the second input power value.

The phase shift between the two counter-propagating signal 15, 16 can be determined by a second demodulation term D2, here non-zero, calculated by the centralized control means 19. Here, the second demodulation term D2 is calculated as follows $$D2=P21-P22 \qquad \text{[Math. 2]}$$

The centralized control means 19, after having calculated the second demodulation term D2 send a third control signal 23 to the control circuit 18. The power balancing in the channels of the interferometer 4 depends on the value of the third control signal 23 and the interferometer channel balancing is here adjusted in such a way as to compensate for the Kerr effect, i.e. here in such a way that the output power values corresponding to the second series of measurements are equal. For example, the centralized control means 19 include a second feedback loop, configured to control the ratio between the powers from the first arm 13 and from the second arm 14 depending on the cancelling of the second demodulation term D2. However, this second demodulation term does not act on the phase ramp, the latter being controlled only depending on the first demodulation term D1.

FIG. 5 illustrates all the measured output powers P11, P12, P21, P22 as a function of time during the implementation of the embodiment illustrated in FIGS. 3 and 4 between times $t_0$ and $t_2$.

Therefore, for each state of the modulation control signal, two measurements are made independently on power values corresponding to the two input power values. In other words, the measurement on the first output power values linked to the first input power value does not interfere with the measurement on the second power values linked to the second input power.

The method according to the invention is advantageously compatible with a modulation having a different number of states opposite two-by-two, for example four modulation states.

Figure 6:
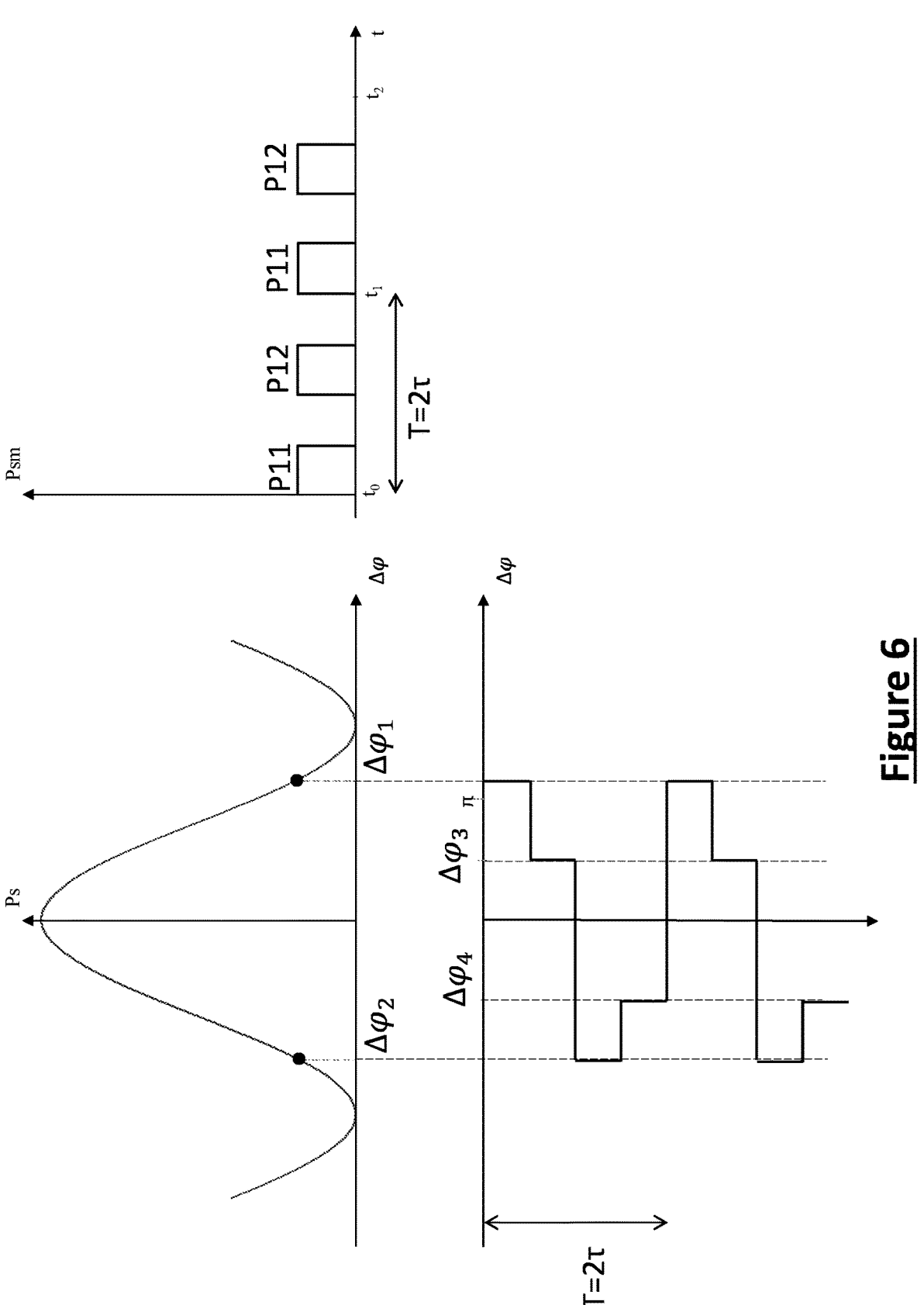
FIG. 6 illustrates a step of another mode of implementation of the method according to the invention.
Figure 7:
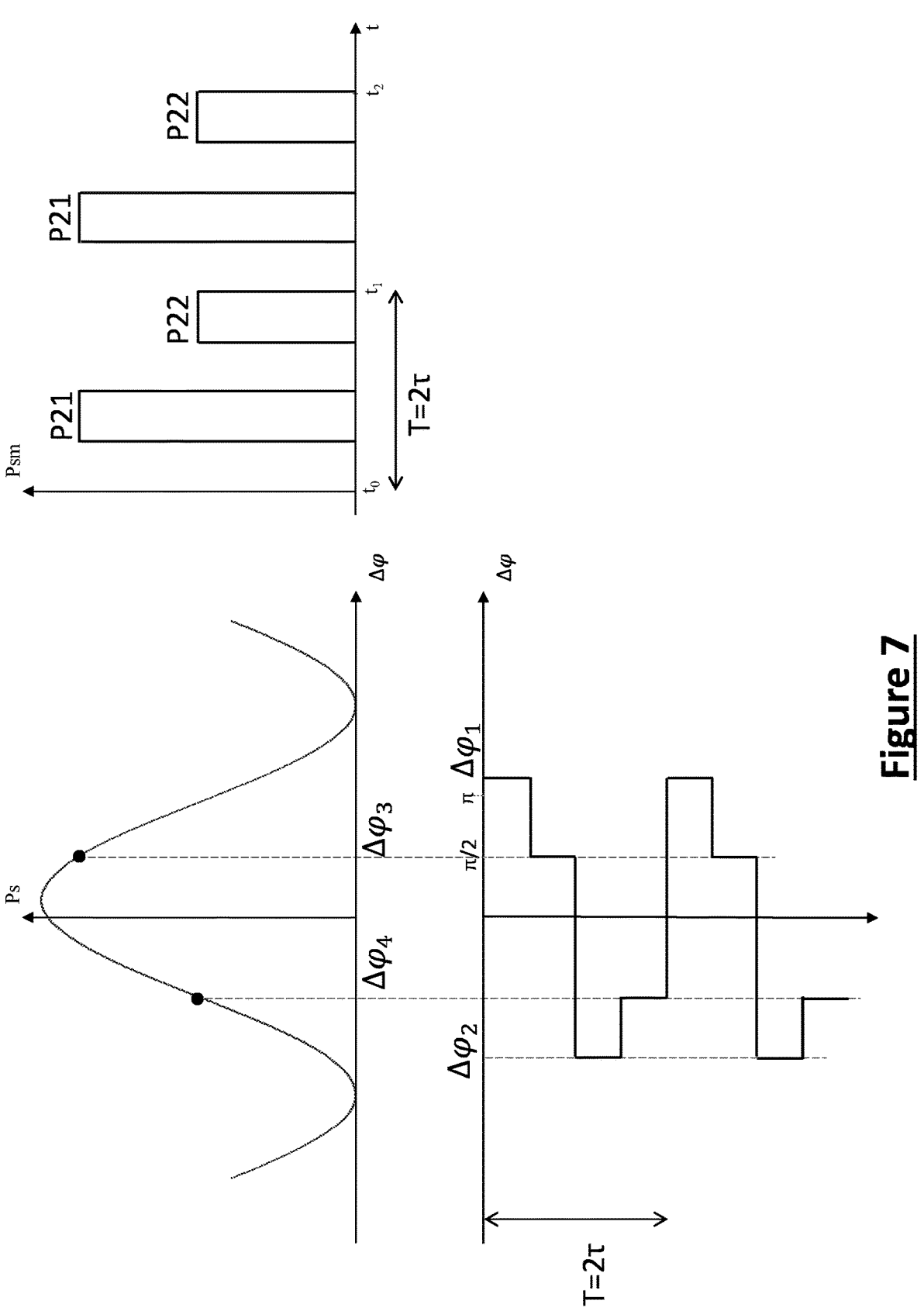
FIG. 7 illustrates another step of the implementation mode of FIG. 6.
Figure 8:
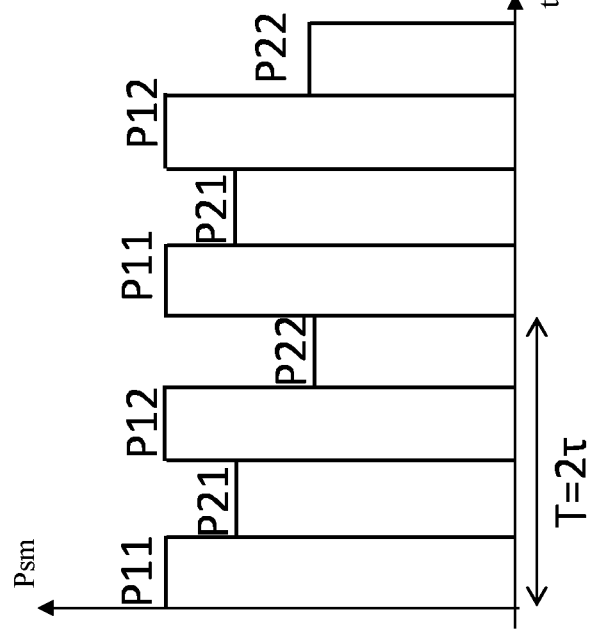
FIG. 8 illustrates a synthesis of the steps of FIGS. 6 and 7.
Figure 8:

FIGS. 6 to 8 illustrate a mode of implementation of the invention wherein the modulation of the phase shift between the counter-propagating signals 15 and 16 is a four-state modulation and wherein each series of measurements includes two measurements. In particular, the first series of measurements and the second series of measurements are here made on distinct modulation states. Therefore, each modulation state is used for a single measurement. It is here talked about a modulation with two states per input power value.

FIGS. 6 and 7 illustrate the implementation of the method over a first modulation period extending between the first time t0 and the second time t1, and over a second modulation period extending between the second time t1 and the third time t2, and each representing independently the processing applied to a distinct input power value. FIG. 6 relates in particular to the first series of measurements and FIG. 7 relates in particular to the second series of measurement.

The modulation is here a modulation with four states opposed two by two, here applied at the proper frequency of the coil. The four states are here the following: a first modulation state $\Delta\varphi1=\pi-k$; a second modulation state $\Delta\varphi2=-\pi+k$; a third modulation state $\Delta\varphi3=\pi-\beta$; a fourth modulation state $\Delta\varphi4=-\pi+\beta$. In the example illustrated in FIGS. 6 and 7, $k=\pi/8$, $\beta=\pi/2$ and the four modulation states are the following: $\Delta\varphi1=7\pi/8$; $\Delta\varphi2=-7\pi/8$; $\Delta\varphi3=\pi/2$; $\Delta\varphi4=-\pi/2$.

The phase modulator 20 adjusts the modulation by adding to the four modulation states a digital phase ramp feedback (not shown in FIG. 3). The steps of this digital ramp, of duration t, cancel (or compensate for) the phase shift between the counter-propagating signals 15 and 16 here generated by the rotation of the gyroscope 1 and by the Kerr effect produced by the counter-propagating signals having power values that correspond to the first input power value.

In the top right corner of FIG. 6 are illustrated the two measurements P11 and P12 of the first series of measurements of the output power Ps sampled on each measurement period. The two measurements P11 and P12 are made at points of the output signal that correspond to the first output power values (linked to the first input power value) and to the first modulation state $\Delta\varphi1$ and the second modulation state $\Delta\varphi2$, respectively. The values of the two power measurements P11, P12 are represented by points on the curve representing the output power Ps as a function of the phase shift $\Delta\varphi$ modulation. The two measurements P11 and P12 are sampled over each modulation period.

Here, the phase ramp is controlled depending on the first modulation term D1 calculated in the same way as what has been described hereinabove.

In the top right corner of FIG. 7 are illustrated the two output power measurements P21 and P22 of the second series of measurements. The two measurements P21 and P22 are made at points of the output signal 11 that correspond to the second output power values (linked to the second input power value) and to the first modulation state $\Delta\varphi3$ and the fourth modulation state $\Delta\varphi4$, respectively. The values of the two power measurements P21, P22 are represented by points on the curve representing the output power Ps as a function of the phase shift $\Delta\varphi$ modulation. The two measurements P21 and P22 are here sampled over each modulation period.

It is observed that, due to the fact that the second and third phase shifts $\Delta\varphi3$, $\Delta\varphi4$ have different values to the first and second phase shifts $\Delta\varphi1$, $\Delta\varphi2$, in particular here lower values, the third measurement and the fourth measurement have higher values.

Therefore, the value differences between the first series of measurements and the second series of measurements are advantageously reduced.

More over, because the third phase shift state $\Delta\varphi3$ and four phase shift state $\Delta\varphi4$ are opposite, the difference between the measurements P21 and P22 of the second series of measurements makes it possible, as hereinabove, to control the power balancing in the channels of the interferometer 4 depending of the cancellation of the second demodulation term D2.

FIG. 8 illustrates all the measured output powers P11, P12, P21, P22 as a function of time during the implementation of the embodiment illustrated in FIGS. 6 and 7 between times $t_0$ and $t_2$. It can be observed that the power differences measured between the first series of measurements and the second series of measurements are advantageously reduced with respect to the differences in the preceding embodiment illustrated in particular in FIG. 5.

The method according to the invention is compatible with a two-state modulation including two series of measurements made on the same modulation states.

Figure 9:
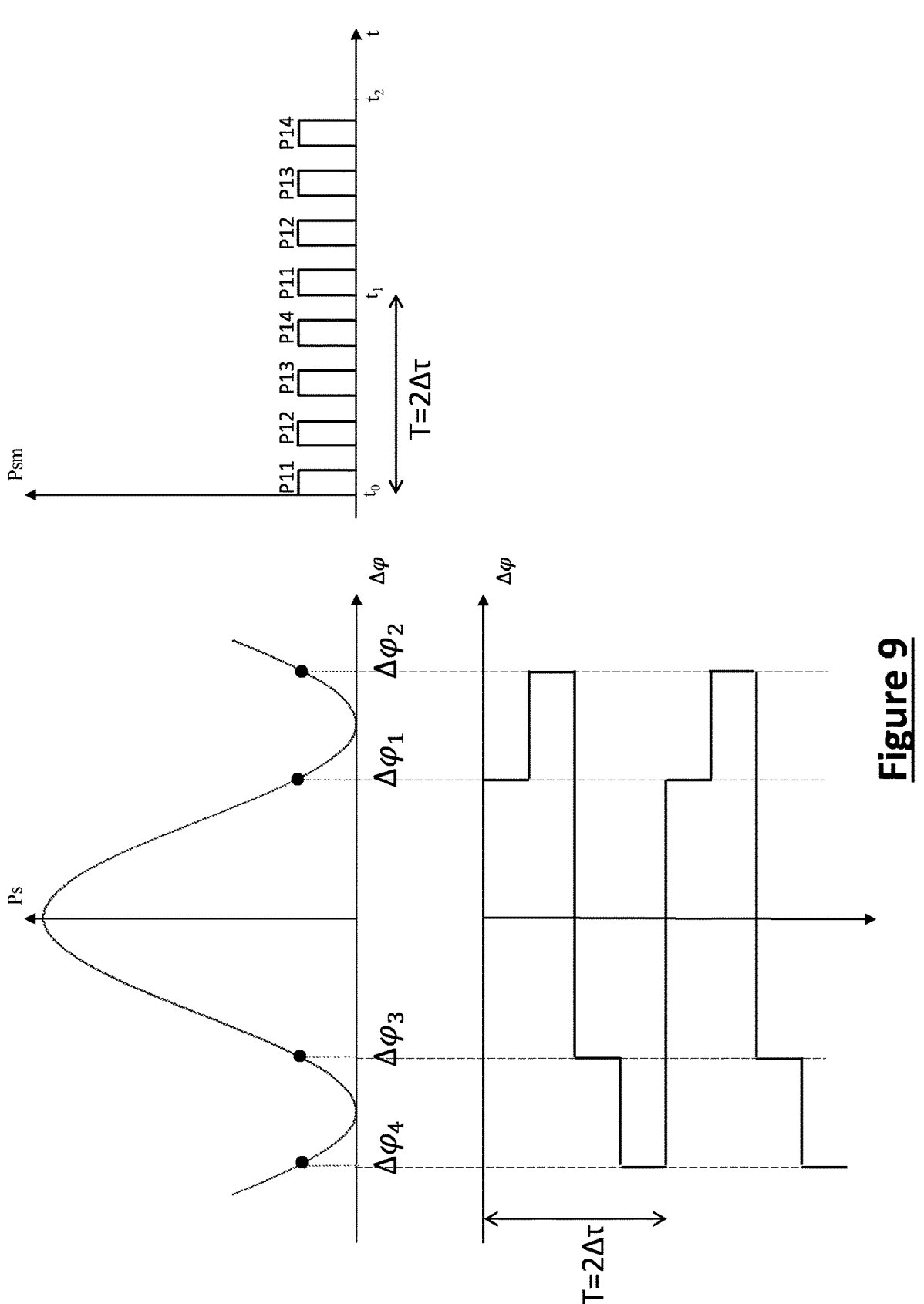
FIG. 9 illustrates a step of another mode of implementation of the method according to the invention.
Figure 10:
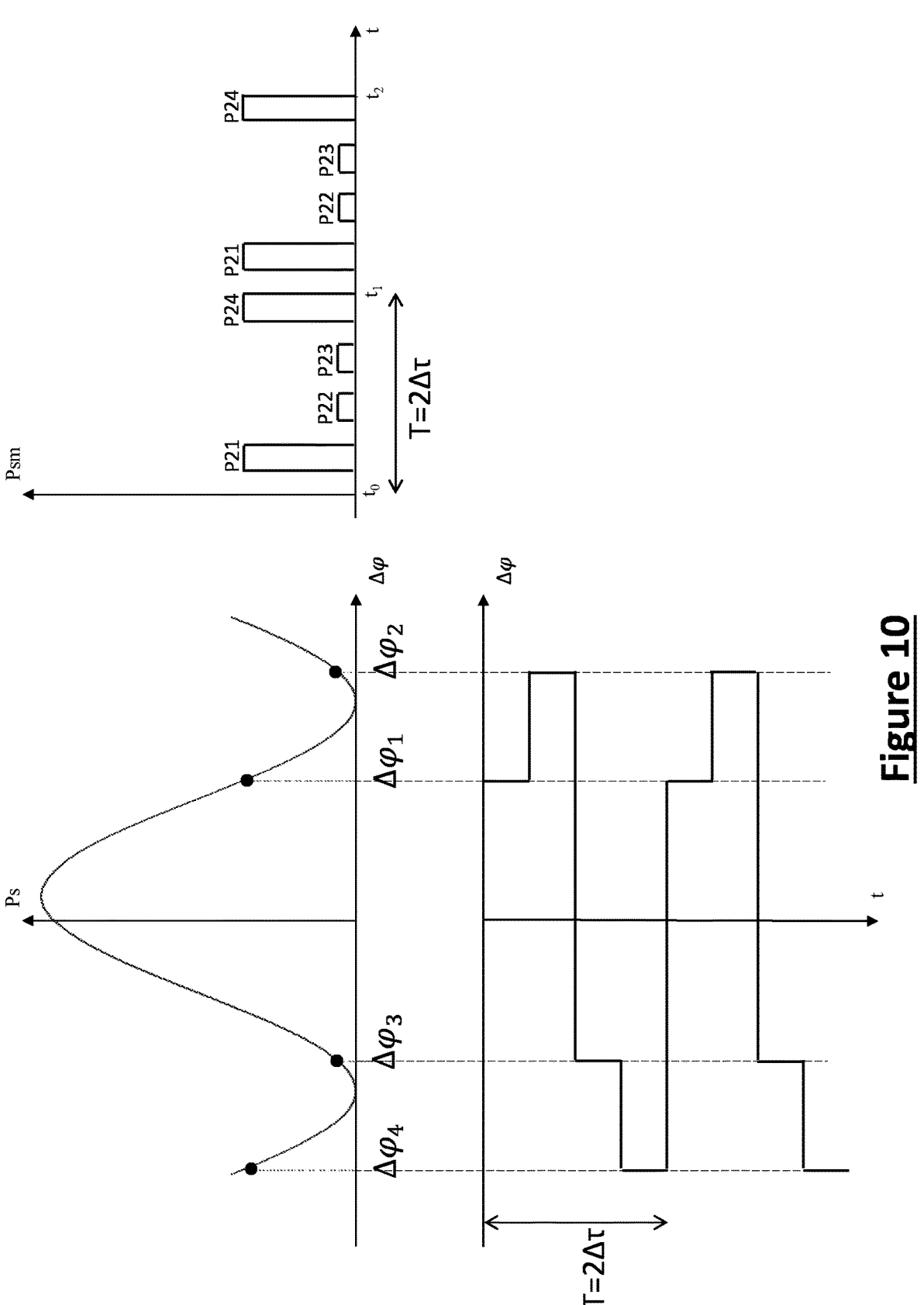
FIG. 10 illustrates another step of the implementation mode of FIG. 9.
Figure 11:
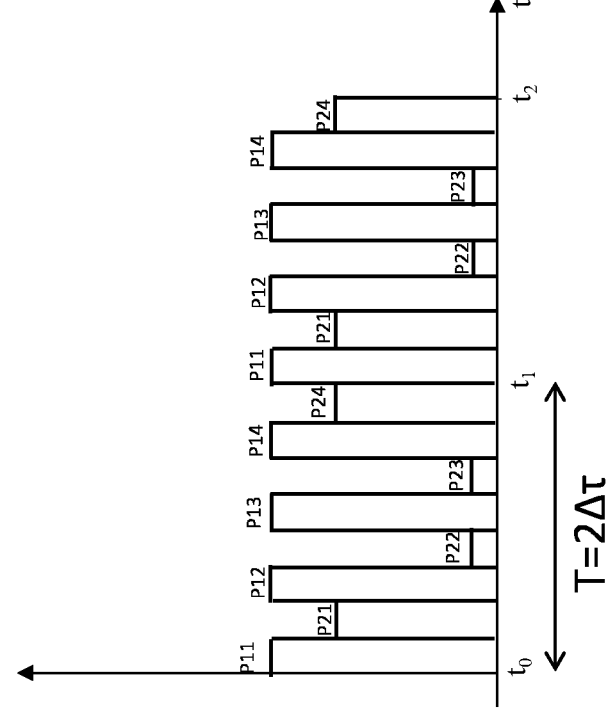
FIG. 11 illustrates a synthesis of the steps of FIGS. 9 and 10.

FIGS. 9 to 11 illustrate a mode of implementation of the method according to the invention wherein the modulation of the phase shift between the counter-propagating signals 15, 16 is a four-state modulation and wherein each series of measurements includes four measurements. Here, each measurement of a series is made at one point of the output signal corresponding to a distinct state of the modulation, it is therefore talked about a modulation with four states per input power value.

FIGS. 9 and 11 illustrate the implementation of the method over the first modulation period extending between a first time t0 and a second time t1, and over a second modulation period extending between the second time t1 and the third time t2 and each representing independently the processing applied to the output power values corresponding to distinct input power values. FIG. 9 relates in particular to the first series of measurements and FIG. 10 relates in particular to the second series of measurement.

The four-state modulation is here applied at the proper frequency of the coil. The four states are the following: a first modulation state $\Delta\varphi1=\pi-k$; a second modulation state $\Delta\varphi2=\pi+k$; a third modulation state $\Delta\varphi3=-\pi+k$; a fourth modulation state $\Delta\varphi4=-\pi-k$. In the example illustrated in FIGS. 9 and 10, $k=\pi/8$, and the four modulation states are the following: $\Delta\varphi1=7\pi/8$; $\Delta\varphi2=9\pi/8$; $\Delta\varphi3=-7\pi/8$; $\Delta\varphi4=-9\pi/8$.

The phase modulator 20 adjusts the modulation by adding to the four modulation states a digital phase ramp feedback (not shown in FIG. 3). The steps of this digital ramp, of duration $\tau$, cancel the phase shift between the counter-propagating signals 15 and 16 generated here by the rotation of the gyroscope 1 and by the Kerr effect produced by the counter-propagating signals having power values that correspond to the first input power value.

In the top right corner of FIG. 9 are represented the four measurements P11, P12, P13 and P14 of the first series of measurements of the output power Ps, here sampled over each modulation period. The four measurements are made at points of the output signal 11 that correspond to the first output power values (linked to the first input power value)

and to the first, second, third and fourth modulation states $\Delta\varphi 1$, $\Delta\varphi 2$, $\Delta\varphi 3$ and $\Delta\varphi 4$, respectively. The values of the four power measurements P11 to P14 are represented by points on the curve representing the output power Ps as a function of the phase shift $\Delta\varphi$ modulation.

In this implementation mode with four modulation states and four measurements per series of measurements, the first demodulation term is determined according to the following expression:

$$D1=P11-P12-P13+P14 \qquad \text{[Math 3]}$$

Moreover, this embodiment advantageously makes it possible to calculate a third demodulation term that makes it possible to adjust the scale factor of the phase shift, better known as $V\pi$. The third demodulation term is obtained by the following expression $$D3=P11-P12+P13-P14 \qquad \text{[Math 4]}$$

In order to simplify the disclosure, the adjustment of $V\pi$ will not be described here and $V\pi$ will be considered as being at the good value.

FIG. 10 illustrates the making of the second series of measurements, which here includes four power measurements P21, P22, P23 and P24, made at points of the output signal 11 that correspond to the second output power values (linked to the second input power value) of the output signal 11 and that correspond to the first, second, third and fourth modulation states $\Delta\varphi 1$, $\Delta\varphi 2$, $\Delta\varphi 3$ and $\Delta\varphi 4$, respectively. The measurements are here sampled over each modulation period. For this second series of measurements, the modulation of the phase shift $\Delta\varphi$ between the two counter-propagating signals is identical to what has been described hereinabove in connection with FIG. 9.

In this implementation mode, the second demodulation term D2 is calculated according to the following expression $$D2=P21-P22-P23+P24 \qquad \text{[Math 5]}$$

The invention is not limited to the modulation state values mentioned hereinabove by way of example, and is compatible with modulations states opposite two-by-two, capable of taking any value.

The input light signal 3 described hereinabove is a square-wave signal. The invention is however not limited to this signal shape and is compatible with any square-wave signal, having any duty cycle, or with any periodic light signal having at least two power levels. Therefore, the invention is compatible with a periodic signal having several rectangular steps, for example 3 or 4 rectangular steps, or also a periodic signal having no rectangular step, for example a sinusoid.

In particular, according to an embodiment, the light signal generator 2 includes light signal modulation means configured in such a way that the input light signal 3 is a square-wave, or rectangular-wave, signal of duty cycle lower than or equal to 50%, for example here equal to 47% and having, at a first point of the input light signal 3, a first input power value equal to its average power multiplied by the gain equal to the constant $\alpha$, here a gain of 2 and, at a second point of the input light signal 3, a second, non-zero, input power value different from the first input power value.

The invention is not limited to the implementation modes and embodiments described hereinabove in relation with FIGS. 1 to 10.

In particular, the control circuit 18 described hereinabove is controlled by a feedback loop. It is however perfectly possible to control it manually for example by setting manually the centralized control means 19 by modifying a program code or by operating one or more components, for example potentiometers.

Moreover, the phase modulator 20 described hereinabove includes two pairs of electrodes located on each arms 13 and 14 of the optical splitter 9. As an alternative, it would be possible that the phase modulator includes only one pair of electrodes located on a single one of the two arms 13 and 14.

The invention is compatible with any type of phase modulator making it possible to apply a phase shift between the two counter-propagating signals, for example a phase modulator including, instead of the pair of electrodes or the pairs of electrodes described hereinabove, one or more electrode system comprising a number of electrodes different from 2, for example 3 or 4 electrodes, or also a phase modulator that would be located at the optical fibre, for example at one and/or the other of the ends 26 and 27.

Moreover, the invention is compatible with a phase modulation having any even number of states, for example six states or twelve states.

The control circuit 18 described hereinabove includes an electro-optic modulator. As an alternative, the gyrometer according to the invention may include any type of modulator for adjusting the power balancing, including a mechanical modulator making it possible to locally adjust the geometry of the fibre, in particular by pinching.

Although it is particularly advantageous that the first output power values are higher than the second output power values, in order to make the first series of measurements on output power values higher than the output power values on which is made the second series of measurements, the invention is compatible with a first series of measurements made on output power values lower than the output power values on which is made the second series of measurements.

Although in the examples described hereinabove in connection with FIGS. 3 to 11 the measurements of the first series of measurements are made over the first half of the modulation period and the measurements of the second series of measurements are made over the second half of the modulation period, it is possible to make the measurements of the first series of measurements over the second half of the modulation period and the measurements of the second series of measurements over the first half of modulation period.

Finally, although the method described hereinabove includes an interferometer channel balancing adjustment controlled depending on the cancellation of the second modulation term, one aspect of the invention relates to a method that is similar to what has been described hereinabove, but that does not comprise the step of interferometer channel balancing adjustment. Therefore, the method according to this aspect simply enables obtaining the second demodulation term representative of the Kerr effect. Thanks to the method according to this aspect, the person skilled in the art can do without the interferometer channel adjustment and for example take into account, in a calculation, the value of the second demodulation term to compensate for the rotation value, or also to control another parameter than the channel balancing depending of the cancellation of the second demodulation term.

The invention claimed is:

1. A method for reducing the Kerr effect in an interferometric measuring device including a light signal generator configured to emit a periodic input light signal having at least two non-zero input power values, and a Sagnac interferometer comprising an optical loop, a splitter configured to couple the periodic input light signal to the optical loop in order to split the light signal into a first signal and a second signal which are mutually counter-propagating, which have each at least two power values, each power value corresponding to one of the non-zero input power values, and which propagate in opposite directions in the optical loop, and to combine said counter-propagating signals after their propagation in the loop so as to form a periodic output signal having at least two output power values, each output power value corresponding to one of the non-zero input power values, the method comprising a periodic modulation with at least two opposite states of the phase shift between the two counter-propagating signals and, over a same modulation period, a. performing a first series of measurements that comprises at least two output power measurements at points of the output signal that have first output power values corresponding to a first non-zero input power value and that correspond to opposite modulation states;

b. determining a first phase-shift between the two counter-propagating signals each having a power value corresponding to the first non-zero input power value, and performing a cancellation of the first phase shift that comprises adjusting the modulation depending on the cancellation of a first calculated demodulation term that is function of said at least two output power measurements of the first series of measurements and that is representative of said phase shift, then c. performing a second series of measurements that comprises at least two measurements at points of the output signal that have second output power values corresponding to a second non-zero input power value and that correspond to opposite modulation states;

d. determining a second phase-shift between the two counter-propagating signals each having a power value corresponding to the second input power value, and a cancellation of the second phase shift, depending on the cancellation of a second calculated demodulation term that is function of said at least two measurements of the second series of measurements and that is representative of the phase shift.

2. The method according to claim 1, wherein the cancellation of the second phase-shift comprises adjusting a ratio between average powers of the counter-propagating signals, depending on the cancellation of the second demodulation term.

3. The method according to claim 1, wherein the periodic modulation is a modulation with four states opposed two by two.

4. The method according to claim 1, wherein the first series of measurements and the second series of measurements are made at points of the output signals that correspond to the same modulation states.

5. The method according to claim 1, wherein a. the first series of measurements comprises a first measurement, a second measurement, a third measurement and a fourth measurement at points of the output signal that correspond to a first modulation state, a second modulation state, a third modulation state and a fourth modulation state, respectively, the first and third modulation states being opposite and the second and fourth modulation states being opposite, the first demodulation term being equal to the difference between the sum of the first and fourth measurements and the sum of the second and third measurements;

b. the second series of measurements comprises a fifth measurement, a sixth measurement, a seventh measurement and an eighth measurement at points of the output signal that correspond to a first modulation state, a second modulation state, a third modulation state and a fourth modulation state, respectively, the second demodulation term being equal to the difference between the sum of the fifth and eighth measurements and the sum of the sixth and seventh measurements.

6. The method according to claim 1, wherein the first series of measurements and the second series of measurements are made at points of the output signal that correspond to distinct modulation states.

7. The method according to claim 1, wherein the modulation period is equal to twice the travel time of the counter-propagating signals in the optical loop divided by a value being an odd positive integer number.

8. The method according to claim 1, wherein the first input power value and the second input power value are chosen in such a way that the first output power values are higher than the second output power values.

9. The method according to claim 2, wherein adjusting the ratio between the average powers of the two counter-propagating signals comprises an electro-optical control by voltage polarisation of the splitter.

10. The method according to claim 1, including a step of modulating the power of the periodic input light signal by way of a square-wave or rectangular-wave input power modulation control signal the duty cycle of which is lower than or equal to 50%, in such a way that the modulated periodic input light signal has:

at a first point of the periodic input signal, a first input power value equal to the product of the average power of the periodic input signal by a gain between 1.6 and 2.4, at a second point of the periodic input signal, a second, non-zero input power value, that is different from the first input power value.

11. The method according to claim 10, wherein the modulation control signal has a duty cycle strictly lower than 50%.

12. The method according to claim 10, wherein the first input power value is higher than the second input power value.

13. An interferometric measurement device comprising:

a light signal generator configured to emit a periodic input light signal having at least two non-zero input power values, and a Sagnac interferometer comprising an optical loop, a splitter configured to couple the periodic input light signal to the optical loop in order to split the light signal into a first signal and a second signal which are mutually counter-propagating, which have each at least two power values, each power value corresponding to one of the non-zero input power values, and which propagate in opposite directions in the optical loop, and to combine said counter-propagating signals after their propagation in the loop so as to form a periodic output signal having at least two output power values, each output power value corresponding to one of the non-zero input power values, the device being configured to implement the method according to claim 1.

14. The device according to claim 13, the device being a fibre-optic gyroscope.

\* \* \* \* \*